Nov. 17, 1942.    C. T. BIRK ET AL    2,302,098
AUTOMATIC TURN INDICATING SWITCH
Filed April 9, 1941
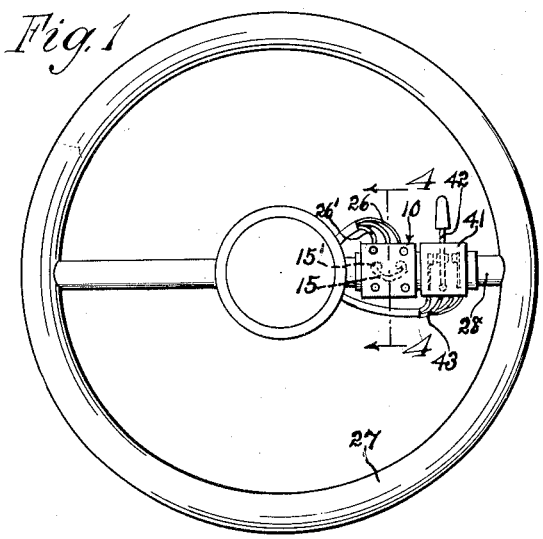
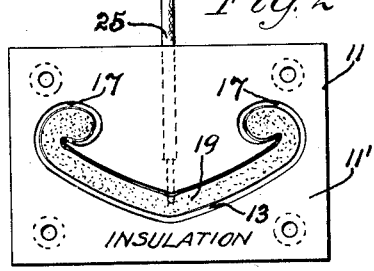
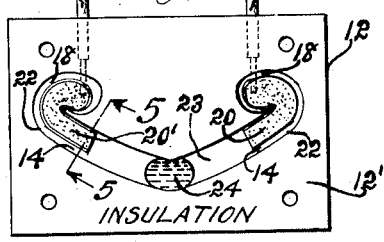
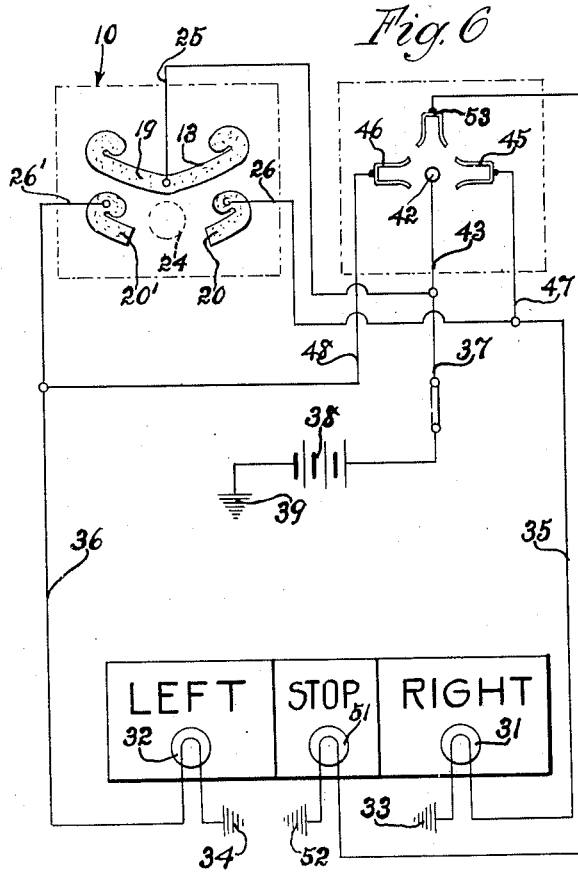
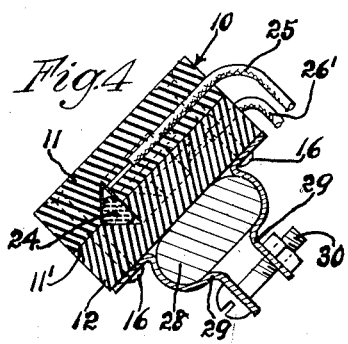
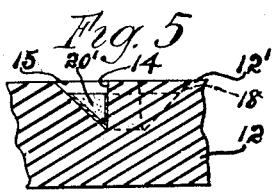
Inventors
Carl T. Birk
Harry G. Kelly
by Daniel Stuwe
Attorney Patented Nov. 17, 1942

2,302,098

UNITED STATES PATENT OFFICE 2,302,098

AUTOMATIC TURN INDICATING SWITCH

Carl T. Birk and Harry G. Kelly, Forest Park, Ill.

Application April 9, 1941, Serial No. 387,706

1 Claim. (Cl. 200—59)

This invention relates to improvements in an automatic turn indicating switch.

The automatic mercury switches for indicating the intended turn of a vehicle, that have heretofore been constructed, as far as known to us, in order to be practical and to perform the intended functions efficiently, required two mercury switches, one for the right-hand turn and the other for the left-hand turn; and they thereby have caused added expense and trouble in the construction, installation, and use.

It is one of the essential objects of this invention to provide an automatic mercury signal switch for a vehicle, which is arranged to function efficiently for indicating a right-hand turn and likewise a left-hand turn of the vehicle, and which is of a simplified and economical construction, so that it can be produced and utilized at a minimum of cost and expense.

Another object of this invention is to provide such an automatic turn indicating mercury switch which will function efficiently by a slight turn as well as by an extended turn of the steering wheel; and wherewith means is furthermore provided for operating the signals independently of the turning of the steering wheel and vehicle or the operation of said automatic switch.

These and various other objects and advantages are attained with this invention, as will become apparent from the following description, taken in connection with the drawing wherein our invention is shown in its preferred form, it being evident that other arrangements and forms of construction may be adopted for carrying out the objects and purposes of our invention.

In the drawing:

Fig. 1 is a plan view showing the steering wheel of an automobile having a turn signaling switch embodying this invention applied thereto.

Fig. 2 is an inverted plan view of the upper member of this switch.

Fig. 3 is a plan view of the lower member of this switch.

Fig. 4 is an enlarged vertical sectional view of the mercury switch, taken on line 4—4 of Fig. 1.

Fig. 5 is an enlarged partial sectional view of the lower member, taken on line 5—5 of Fig. 3.

Fig. 6 is a diagrammatic view showing turn signaling and stop circuits embodying our present invention, comprising our automatic mercury switch and also the manual switch means combined therewith.

This present invention is illustrated in the drawing in its preferred form of construction, mounted in its preferred mode of application upon a steering member of a motor vehicle, and provided and combined with suitable turn signaling circuits and stop circuit thereof.

Our improved mercury switch comprises a switch casing or housing 10 which consists of a pair of members 11 and 12 that are made of insulating material, and which are substantially flat and block-like in form, thereby constituting an upper half and a lower half of the switch casing when mounted in the inclined operative position.

These two members have a pair of curved grooves 13 and 14 provided in their meeting faces 11' and 12', respectively, which register and thus form a curved channel 15 when said faces are secured together, by cement, or by suitable elements 16 as shown in Fig. 4. Said two grooves 13 and 14 are provided with bent-over end portions 17 and 18, respectively, at their two ends, which are preferably slightly enlarged and thus provide a pair of end pockets 15' at the two ends of channel 15; and this casing is mounted in an inclined position, about as indicated in Fig. 4, so that the pockets 15' extend upwardly.

One of the two grooves, in this illustrated form the upper groove 13, is provided with an electricity conducting element or means 19 therein, and this is extended the entire length of said groove including the bent-over end portions 17, as indicated in Fig. 2; and this means is conveniently applied as a thin coating or a thin layer of suitable metal, such as brass, and is stopped slightly short of the face or surface of the block, as indicated in Fig. 5. The other groove, herein the lower groove 14, is similarly provided with such electricity conducting means or elements 20 and 20' therein; which, however, are placed only in the two end parts 22 and in the bent-over end portions 18, as best shown in Fig. 3, thereby retaining the middle or central part 23 of said groove uncovered and so only of non-conducting material. Said grooves are preferably made angular in cross-section, substantially as indicated in the drawing.

A globule of mercury 24 is placed in this channel 15, and it will normally rest in the intermediate part thereof on the non-conducting part 23, in its circuit opening position; but this globule and the grooves are of such size that the globule will always remain in contact with the upper conducting means 19. When the steering member and the switch thereon are turned, then the globule will move into either of the end portions of the channel 15 and finally into the particular end pocket 15', thereby engaging the conducting means 20 or 20' as well as the means 19 and completing the circuit therethru and thru the respective signal light. These pockets are provided so that when the steering wheel with this switch thereon will be turned for an extended distance in turning the vehicle, the globule will be retained in place in its respective pocket to keep the proper circuit closed, instead of moving to the neutral position and into the opposite pocket, as happens by the use of the former continuous straight channel.

In this switch construction the conducting means 19 in said groove 13 is provided with a lead wire or suitable electricity conductor 25, while the right-hand and the left-hand conducting means 20 and 20' in said two end parts 22 are likewise provided with a pair of lead wires or conductors 26 and 26'; and these conductors preferably extend from their respective conducting means thru suitable bores or apertures provided in said members 11 and 12, so as to be extended in an unobstructing way therefrom along or thru the usual steering column wherein the steering post operates that has the steering wheel 27 mounted thereon.

This switch is arranged and adapted to be mounted on one of the turnable members of the customary steering means of the modern motor vehicle, so as to turn therewith in steering the vehicle; and it is disposed in an inclined position, so that the two end pockets 15' with the conducting means 20 and 20' therein will be placed in the upper position, while the non-conducting middle part 23 is in the lower position, somewhat as indicated in the drawing.

Our switch is illustrated herein as being mounted on a spoke 28 of the steering wheel 27, and it is therefore provided with bracket arms or clamping means 29, being conveniently secured onto the casing by said elements 16, and said arms have a screw 30 in their outer ends, whereby this switch can be readily mounted and adjusted in its proper position on said spoke 28. This switch may also be mounted in the horn button, or even on the base of the steering post.

As illustrated in Fig. 6, this switch is provided with and is installed in a suitable signal circuit or turn indicating circuit of a motor vehicle; and such circuit includes signal lights 31 and 32 for indicating, respectively, an intended right-hand turn and left-hand turn of the vehicle, which lights are grounded at 33 and 34 and are connected, respectively, thru conductors 35 and 36 with the lead wires 26 and 26' of the pair of conducting means 20 and 20'. The common lead wire 25 is connected thru a conductor 37 with the vehicle battery, as indicated at 38 and grounded at 39.

Our automatic mercury switch is preferably also provided with means for manually operating the signals prior to and independently of any turning of the steering means for turning the vehicle; and this manual means comprises a switch device 41 which may be conveniently mounted on the spoke 28 of the steering wheel, and which includes a resilient lever or contact making element 42 connected by a conductor 43 with said conductor 37, being movable into engagement with right-hand and left-hand contact elements 45 and 46 connected thru conductors 47 and 48 with said signal light conductors 35 and 36. Said lever 42 is resilient, so that it will be returned automatically to its neutral or circuit-opening position whenever it is released.

This manual switch device is preferably also connected with the stop light 51 grounded at 52 on the vehicle, and a contact element 53 of the device is connected thru a conductor 54 with said stop light, to be engaged by said lever 42, so that a stop signal can be given also with this manual switch part of our invention.

We claim:

In the signal mechanism of a motor vehicle containing a rotatable steering member and a right-turn and a left-turn signal circuit, a mercury switch included in both of the circuits and comprising a flat casing mounted in an inclined plane on said steering member to be automatically turned therewith for closing either one of said circuits, said switch casing consisting of a pair of connected blocks of insulating material provided in their adjoining faces with a pair of registering curved grooves each of which is substantially triangular in cross-section cut transversely of the groove and each groove having a pair of turned-over and enlarged end portions at its two ends, thereby producing a curved channel which is likewise substantially triangular in cross-section and is provided with a pair of upturned and enlarged end pockets, a thin coating of conducting material provided in one of said grooves for the full length thereof including said turned-over end portions, a conductor extending from said coating thru the casing and being common to both of said circuits, a pair of thin conducting strips in the two end parts and the turned-over end portions of the other groove, while the central part of this groove remains non-conducting, a conductor extending from each of said strips thru the casing and being included in one of said circuits, and a globule of mercury which normally rests on said central part in circuit-opening position and will be moved automatically upon the respective one of said pair of strips and into its upturned pocket, by turning said steering member, to close the connected circuit and to hold it safely closed even upon excessive turning of said member.

CARL T. BIRK.
HARRY G. KELLY.